United States Patent
Kienholz et al.

(10) Patent No.: US 10,207,377 B2
(45) Date of Patent: Feb. 19, 2019

(54) DEVICE FOR MACHINING A PLANAR WORKPIECE

(71) Applicant: KIESLING MASCHINENTECHNIK GMBH, Dietzenbach (DE)

(72) Inventors: Matthias Kienholz, Biebertal (DE); Lars Martin, Münzenberg (DE); Kersten Wurm, Dietzenbach (DE); Alexander Glowacki, Karben (DE)

(73) Assignee: Rittal GmbH & Co. Kg (DE)

( * ) Notice: Subject to any disclaimer, the term of this patent is extended or adjusted under 35 U.S.C. 154(b) by 2 days.

(21) Appl. No.: 15/529,033

(22) PCT Filed: Nov. 4, 2015

(86) PCT No.: PCT/DE2015/100466
§ 371 (c)(1),
(2) Date: May 23, 2017

(87) PCT Pub. No.: WO2016/082821
PCT Pub. Date: Jun. 2, 2016

(65) Prior Publication Data
US 2017/0259386 A1 Sep. 14, 2017

(30) Foreign Application Priority Data
Nov. 24, 2014 (DE) .................. 10 2014 117 130

(51) Int. Cl.
*B23Q 3/06* (2006.01)
*B23Q 3/00* (2006.01)
*B23Q 11/00* (2006.01)

(52) U.S. Cl.
CPC ............. *B23Q 3/002* (2013.01); *B23Q 3/069* (2013.01); *B23Q 11/0046* (2013.01); *B23Q 2240/002* (2013.01)

(58) Field of Classification Search
CPC ...... B23Q 3/002; B23Q 3/069; B23Q 11/0046
See application file for complete search history.

(56) References Cited

U.S. PATENT DOCUMENTS 3,587,391 A   6/1971 Pitts et al.
3,942,411 A   3/1976 Gerber
(Continued)

FOREIGN PATENT DOCUMENTS

DE       3733534 A1    4/1989
DE   10 2008 014 358 A1   10/2009
(Continued)

OTHER PUBLICATIONS

International Search Report (in English and German) and Written Opinion (in German) issued in PCT/DE2015/100466, dated Mar. 7, 2016; ISA/EP.

*Primary Examiner* — Daniel Howell
(74) *Attorney, Agent, or Firm* — Harness, Dickey & Pierce, PLC (57) ABSTRACT

The invention relates to a device for machining a planar workpiece, having a machine stand which has a support surface (application surface) for a planar workpiece, and further having a machining head which can be moved relative to the support surface, which machining head has a tool for machining the workpiece and also has a holding unit ("hold-down unit") with a pressure plate whereby the workpiece is pressed against the supporting surface; characterized in that the pressure plate has a structure which is comprised of a plurality of pieces, preferably two pieces, wherein at least one of the pressure plate parts is movable back and forth relative to at least one other pressure plate part, namely it is movable between the application position, in which the pressure plate part presses the workpiece against the application surface when the workpiece is applied to said application surface, and a released position, in which the pressure (Continued)

plate piece is at a minimum distance away from the workpiece when the workpiece is applied to said application surface.

5 Claims, 8 Drawing Sheets

(56) References Cited

U.S. PATENT DOCUMENTS

| | | | | | |
|---|---|---|---|---|---|
| 4,251,174 | A | * | 2/1981 | Satler | B23C 1/06 |
| | | | | | 144/135.2 |
| 4,304,512 | A | * | 12/1981 | Vierstraete | B23Q 3/069 |
| | | | | | 144/135.2 |
| 4,382,728 | A | * | 5/1983 | Anderson | B23C 1/002 |
| | | | | | 144/135.2 |
| 4,601,619 | A | * | 7/1986 | Stinnett | B23Q 1/5468 |
| | | | | | 409/178 |
| 4,822,219 | A | * | 4/1989 | Wood | B23Q 3/002 |
| | | | | | 144/252.1 |
| 5,893,687 | A | * | 4/1999 | Oketani | B23Q 3/002 |
| | | | | | 408/67 |
| 7,404,512 | B2 | | 7/2008 | Baumann et al. | |

FOREIGN PATENT DOCUMENTS

| | | | |
|---|---|---|---|
| EP | 0208079 | A1 | 1/1987 |
| JP | 09309041 | A * | 12/1997 |
| JP | 2000141113 | A * | 5/2000 |
| JP | 2000233309 | A * | 8/2000 |
| JP | 2001205539 | A * | 7/2001 |
| JP | 2002239992 | A * | 8/2002 |
| JP | 4017895 | B2 | 12/2007 |
| SU | 1138319 | A * | 2/1985 |
| WO | WO-2015176753 | A1 | 11/2015 |

* cited by examiner

DEVICE FOR MACHINING A PLANAR WORKPIECE

CROSS-REFERENCE TO RELATED APPLICATIONS

This application is a 371 U.S. National Stage of International Application No. PCT/DE2015/100466, filed on Nov. 4, 2015, which claims priority to German Application No. 10 2014 117 130.6, filed on Nov. 24, 2014. The entire disclosures of the above applications are incorporated herein by reference.

BACKGROUND OF THE INVENTION

Field

The relates to a device for machining a planar workpiece, having a machine stand which has a support surface (application surface) for a planar workpiece, and further having a machining head which can be moved relative to the support surface, which machining head has a tool for machining the workpiece and also has a holding unit ("hold-down unit") with a pressure plate whereby the workpiece is pressed against the supporting surface by means of said pressure plate. Such a device is known from DE 10 2008 014358 A1.

Discussion

This section provides background information related to the present disclosure which is not necessarily prior art.

Devices of this general type are used in particular for fabrication of the interior structure of switching panels. The electronic components of the switching panels are disposed on the mounting plate according to a distribution pattern, which may be optimized, e.g., based on thermal considerations or based on the wiring configuration. With the aid of the inventive device, it is possible to provide openings, recesses, and the like in the mounting plate, in accordance with the distribution pattern, which openings, recesses, and the like serve for mounting of the electronic components or for heat removal from said components.

For machining of the mounting plate, a machining head which has a tool, e.g. a milling cutter, is guided over the workpiece. With flat workpieces, such as mounting plates, the machining may result in "bulging" of the workpiece, or development of vibrations, which will negatively affect the service life of the tool and the achievable speed of advance of the tool.

The vibrations which occur are frequently accompanied by substantial noise emissions.

In order to avoid the "bulging" and the vibrations, according to DE 10 2008 014358 A1 it is proposed to equip the machining head with a holding unit which has a pressure plate which serves to press the workpiece against the support surface. As a rule, the planar workpiece is attached to the machine stand by means of mounting claws or clamps which engage the peripheral region of the workpiece. The pressure plate known from the prior art has the drawback that it can collide with the mounting claws or clamps when the machining head is machining the workpiece in the peripheral region. With devices according to the prior art, it is impossible to machine the workpiece in the region near its edge region (peripheral region). Instead, current practice is to retract the pressure plate in the peripheral region of the workpiece, so that the mounting claws or clamps can be passed over without colliding with the pressure plate. However, this results in the workpiece swinging or "bulging" as a result of the machining process, with the adverse effects described above.

SUMMARY

This section provides a general summary of the disclosure, and is not a comprehensive disclosure of its full scope or all of its features.

Accordingly, the object of the present disclosure is to improve a device of the general type described above, such that a workpiece can be machined even in its peripheral region without sacrificing effective vibration damping.

The disclosure device is distinguished in that the pressure plate has a structure which is comprised of a plurality of pieces, preferably two pieces, wherein at least one of the pressure plate parts is movable back and forth relative to at least one other pressure plate part, namely it is movable between the application position, in which the pressure plate part presses the workpiece against the application surface when the workpiece is applied to said application surface, and a released position, in which the pressure plate piece is at a minimum distance away from the workpiece when the workpiece is applied to said application surface.

Although it is possible with devices according to the prior art to machine a workpiece in its peripheral region, provided that the pressure plate is completely retracted from the workpiece, this leads to vibrations of the workpiece; in contrast, with the inventive device at least a part of the pressure plate presses the workpiece against the support surface even in the peripheral region of the workpiece, wherewith only the part of the pressure plate which might collide with a mounting claw or clamp or the like in said peripheral region is retracted from the workpiece. In this way the inventive device makes it possible to machine the workpiece in the peripheral region of the workpiece without complete retraction of the pressure plate from the workpiece.

The area of applicability of the inventive device is further broadened in that all of the pressure plate parts are moved back and forth mutually independently between an application position in which a given pressure plate part is pressed against the application surface when the workpiece is applied to said application surface, and a released position, in which the pressure plate piece is at a minimum distance away from the workpiece when the workpiece is applied to said application surface.

Preferably, the pressure plate has an application side by means of which the pressure plate can be applied to a planar workpiece, wherein the application side of the pressure plate is distributed over a plurality of, or all of, the pressure plate parts.

Particularly for machining of rectangular planar workpieces, according to an embodiment of the disclosure it is provided that the pressure plate is divided horizontally or vertically, wherewith at least one of the pressure plate parts is movable back and forth between the application position and the released position, by means of a displacing unit.

The movements which the pressure plate parts execute when passing between the application position and the released position are not limited to any specific types of movements. However, linear, hinge-type movement, or swinging movement is preferred, because such movements are easy to realize with the use of customary displacing units. The displacing unit may have, e.g., a pneumatic drive or a hydraulic drive. Thus, according to an embodiment of the disclosure at least one pressure plate part is guided by the displacing unit in a linear movement in a direction perpendicular to the application surface or in a swinging movement between the application position and the released position. In the case of a pressure plate which is comprised or two pressure plate parts, it is also conceivable, e.g., that the two pressure plate parts are interconnected by a hinge, so that as required a given one of the two pressure plate parts can be swung away from the workpiece if it is sought to machine the workpiece in its peripheral region.

According to another embodiment of the disclosure, the pressure plate has a workpiece passageway extending through the pressure plate perpendicularly to the application side, wherein the opening cross section of the workpiece passageway is divided between the pressure plate parts, wherewith in the case of a two-part realization it is preferably divided in the amount of one half for each pressure plate part, or extends completely over one of the pressure plate parts.

According to still another embodiment of the disclosure, the pressure plate is divided in half, with the two pressure plate parts each having a partial application side which is the same size as the other, and wherein the workpiece passageway is formed from a first and a second recess in the edge regions of the two pressure plate parts.

Preferably, a chip removal system (removal by suction) is formed on a side of the pressure plate which is opposite to the application side, which removal system is comprised of a suction chamber into which the workpiece passageway and a suction line open out. If the suction chamber extends over a plurality of pressure plate parts, it is necessary that the suction chamber also be divided into a corresponding number of parts, so that when one of the pressure plate parts is displaced with respect to the other pressure plate parts, the suction chamber can react to the new geometry. If, e.g., the pressure plate parts can be displaced with respect to each other in a linear fashion and perpendicularly to the support surface, it may be provided that the suction chamber is also divided, with the division extending perpendicularly to the support surface, so that, when one of the pressure plate parts is displaced, the associated ("relevant") suction chamber part is correspondingly linearly displaced.

In order to improve the movability of the machining head on the workpiece, according to yet another embodiment of the disclosure it is provided that a bearing means to facilitate smooth movement is disposed on the application side of the pressure plate, so that, when the pressure plate is applied to the workpiece, the machining head can be easily guided over the workpiece surface. The use of bearing means to facilitate smooth movement has been found to be advantageous not only for multi-part pressure plates but also for single-part pressure plates.

In order to avoid scratching of the workpiece by foreign bodies, such as metal chips, which are present on the workpiece surface, according to another embodiment of the disclosure the bearing means to facilitate smooth movement is comprised of at least one spherical roller which has air flowing around it, so that foreign bodies present on the workpiece in the region around the spherical roller(s) are kept appreciably away from the spherical roller(s). Preferably, the pressure plate has three or four spherical rollers which have air flowing around them, so that the pressure plate is maintained in contact with the workpiece only via the spherical rollers, so that effective means of preventing damage to the workpiece are provided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts through the several views of the drawings.

DETAILED DESCRIPTION

Example embodiments will now be described more fully with reference to their accompanying drawings.

FIGS. 1 to 8 illustrate an embodiment of the inventive holding unit 1, with different positions of the pressure plate parts 2.2 and 2.2. The holding unit 1 is comprised essentially of a pressure plate 2 which is linearly displaceable by means of a displacing unit 3. The pressure plate 2 is divided horizontally into two essentially identical separate pressure plate parts 2.1 and 2.2. Both of the pressure plate parts 2.1 and 2.2 can be linearly displaced with respect to each other by the displacing unit 3. For this purpose, the displacing unit 3 has an upper pneumatic unit 3.1 which engages the upper pressure plate part 2.1 and a lower pneumatic unit 3.2 which engages the lower pressure plate part 2.2. The two pressure plate parts 2.1 and 2.2 are linearly displaceable with respect to each other and perpendicularly with respect to the support surface of the workpiece, with the aid of the pneumatic units 3.1 and 3.2.

The pressure plate has a tool passageway 5 through which a tool, e.g. a milling cutter, can be applied to the workpiece when the pressure plate 2 is in the application position (pressing position). The tool passageway 5 opens out into a suction chamber 7 on the side of the pressure plate 2 which is opposite to the application side 4. Further, a suction line 8 of a chip removal system opens out into the suction chamber 7. The upper pressure plate part 2.1 also has a minimal lubrication means 10 the outflow nozzle of which is coordinated with the tool passageway 5 on the application side 4.

Further, on the application side 4, spherical rollers 9 are disposed which are intended facilitate easy transport of the holding unit 1 over the workpiece. The spherical rollers 9 are in the form of spherical rolls with air flowing around them. For spherical rolls known from the prior art, the air flow serves to reduce the rolling resistance between the sphere and its bearing support, and thereby to facilitate transport of heavy loads. In the present embodiment, however, the air flow is employed to remove contaminants which may be present on the tool, e.g. chips, from the spherical rolls, in order to effectively prevent damage to the workpiece, e.g. by scratching.

Figure 1:
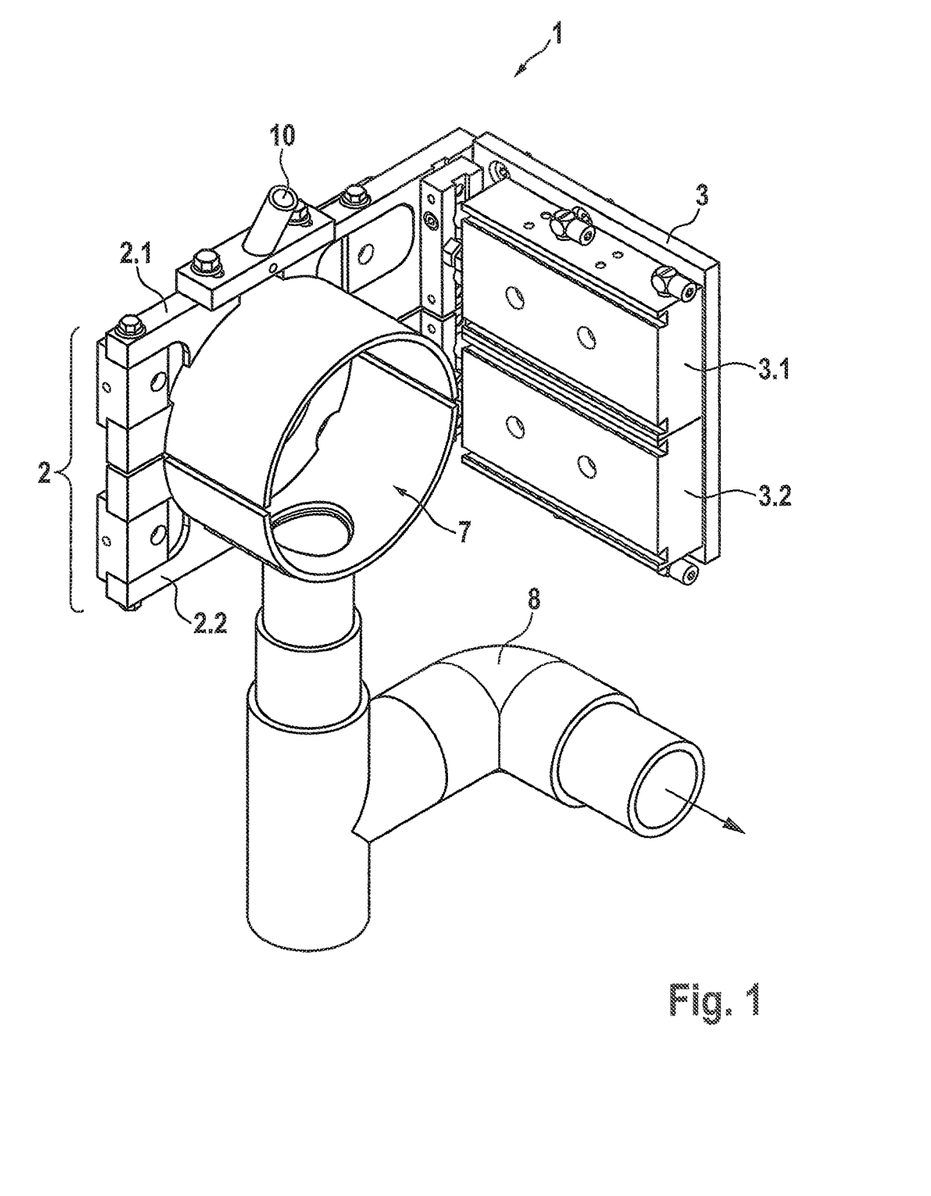
FIG. 1 illustrates an embodiment of the inventive holding unit, in a perspective rear view, with the pressure plate parts being aligned.
Figure 2:
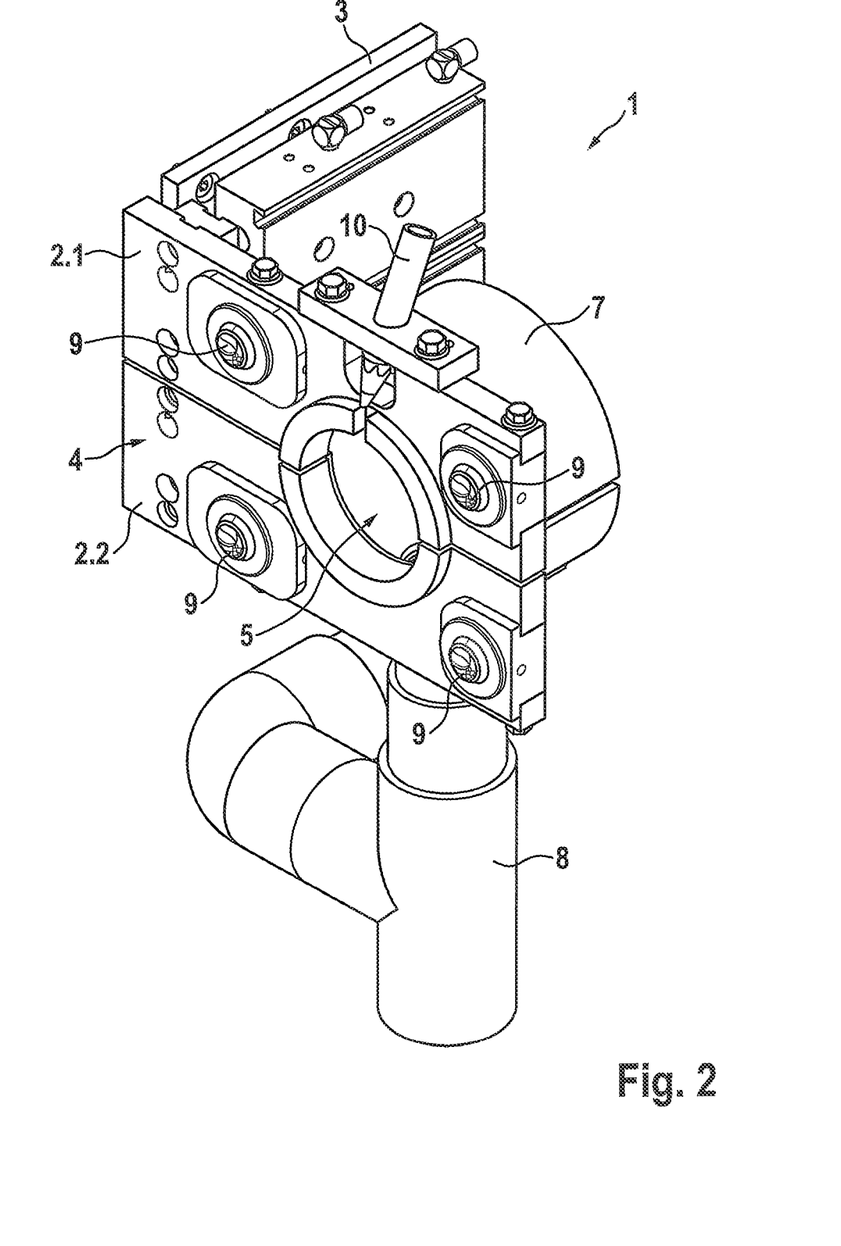
FIG. 2 is a perspective front view of the embodiment according to FIG. 1.
Figure 3:
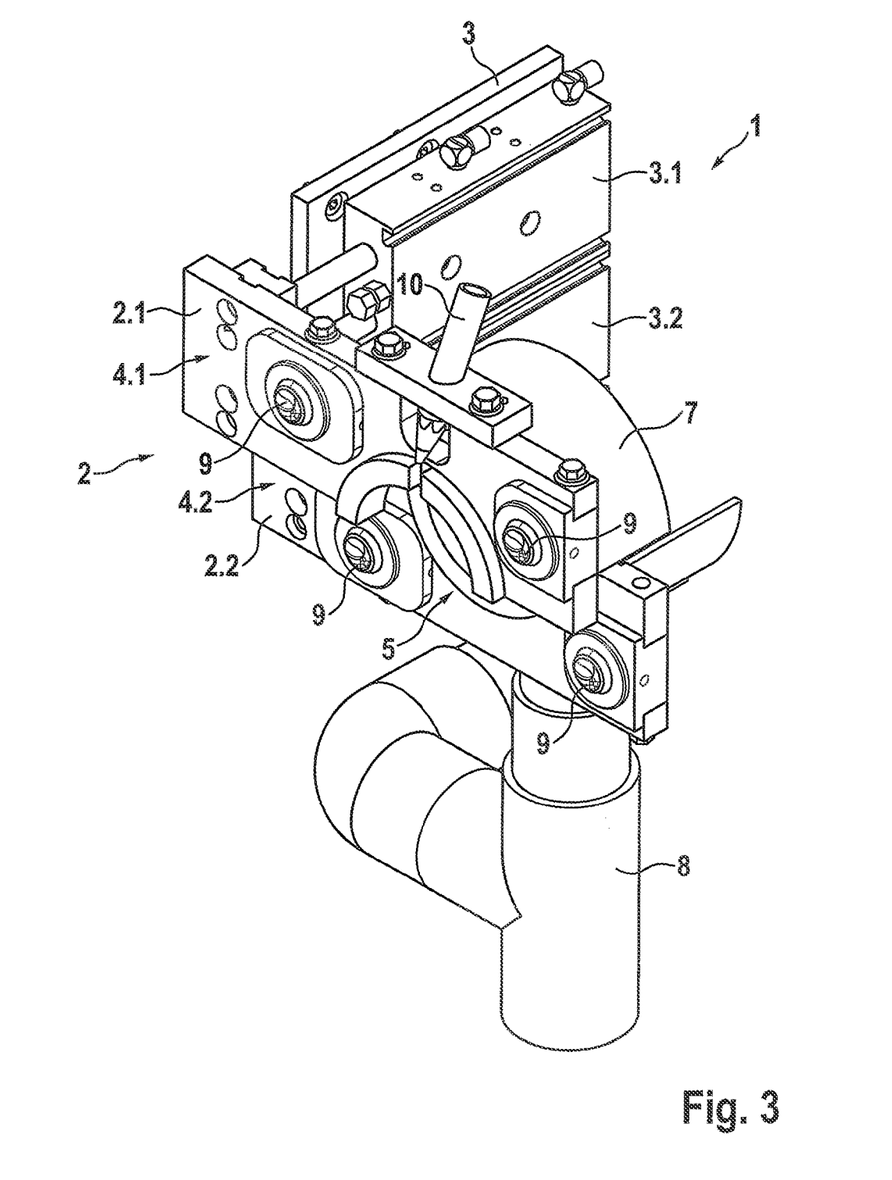
FIG. 3 is a perspective front view of the embodiment according to FIG. 1, wherein the upper pressure plate part is displaced with respect to the lower pressure plate part.
Figure 4:
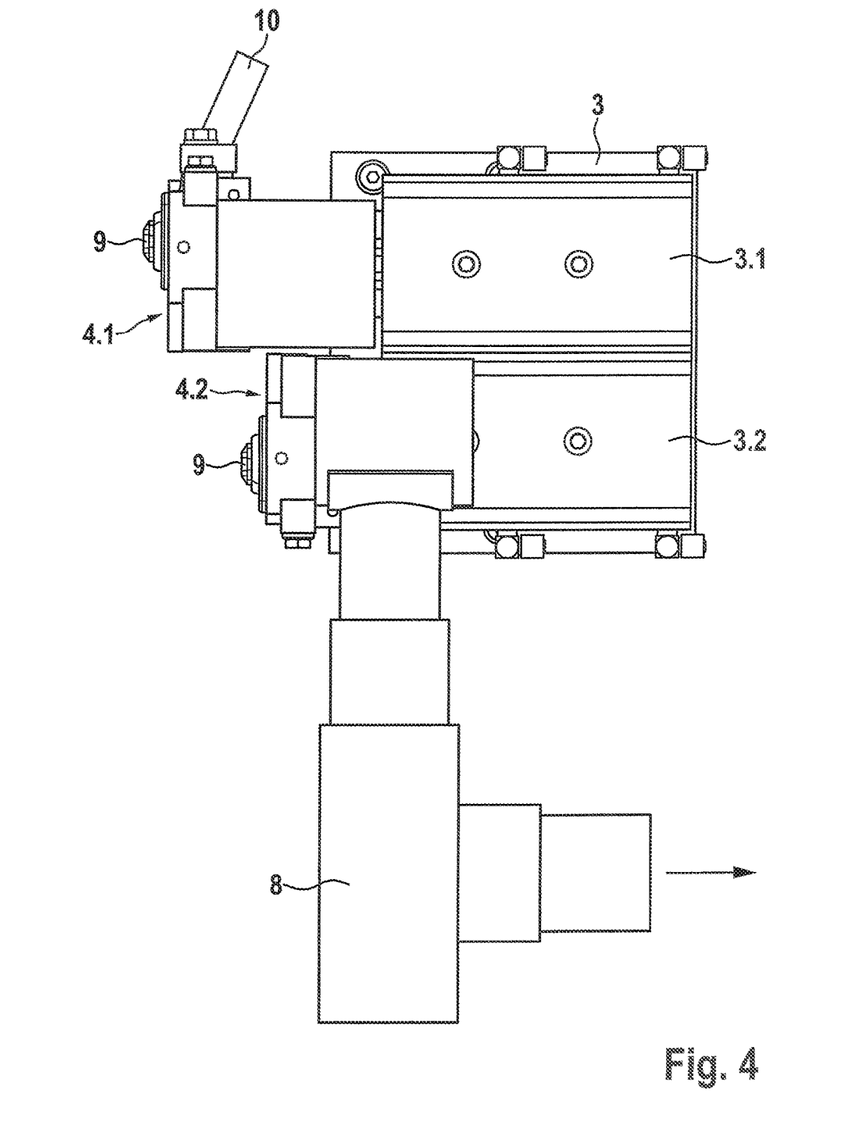
FIG. 4 is a lateral view of the embodiment according to FIG. 3.
Figure 5:
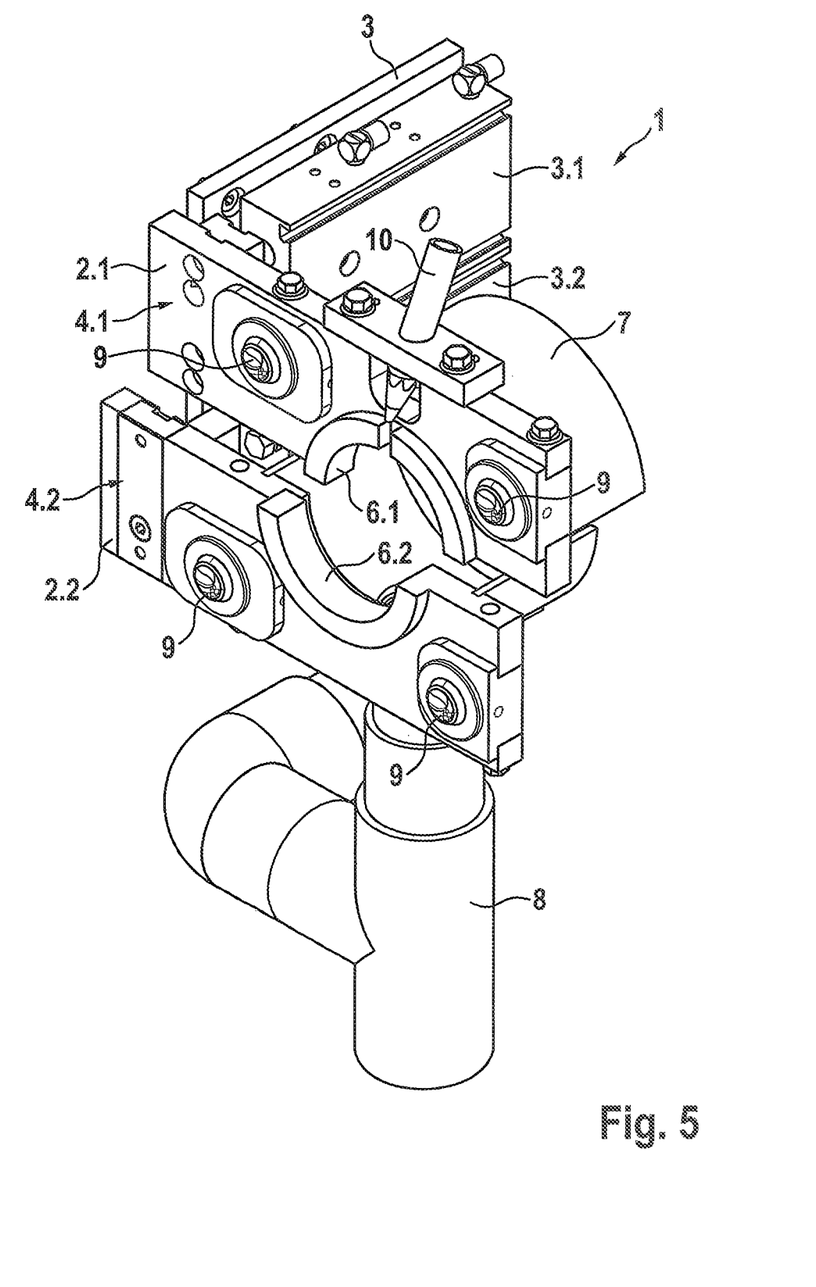
FIG. 5 is a perspective front view of the embodiment according to FIG. 1, wherein the lower pressure plate part is displaced with respect to the upper pressure plate part.
Figure 6:
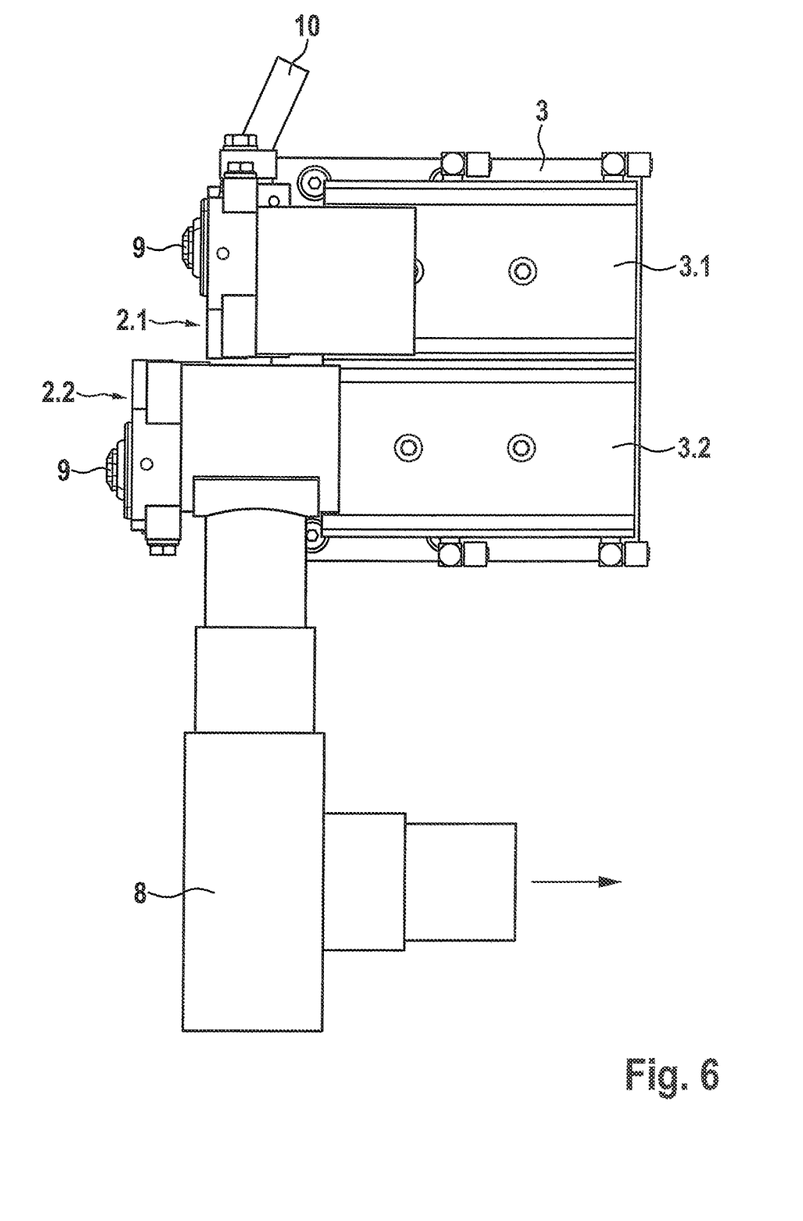
FIG. 6 is a lateral view of the embodiment according to FIG. 5.
Figure 7:
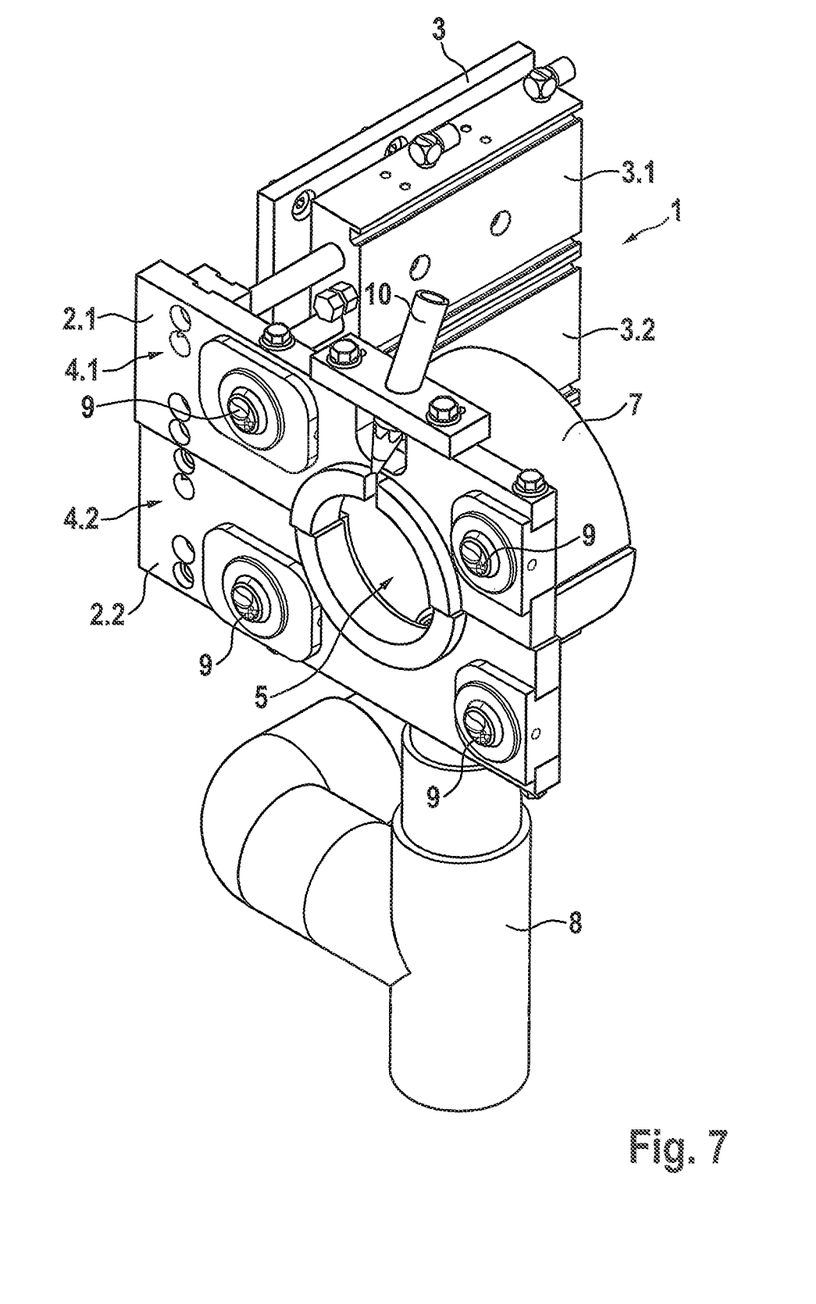
FIG. 7 illustrates the embodiment according to FIG. 1, wherein both pressure plate parts are disposed in an extended position.
Figure 8:
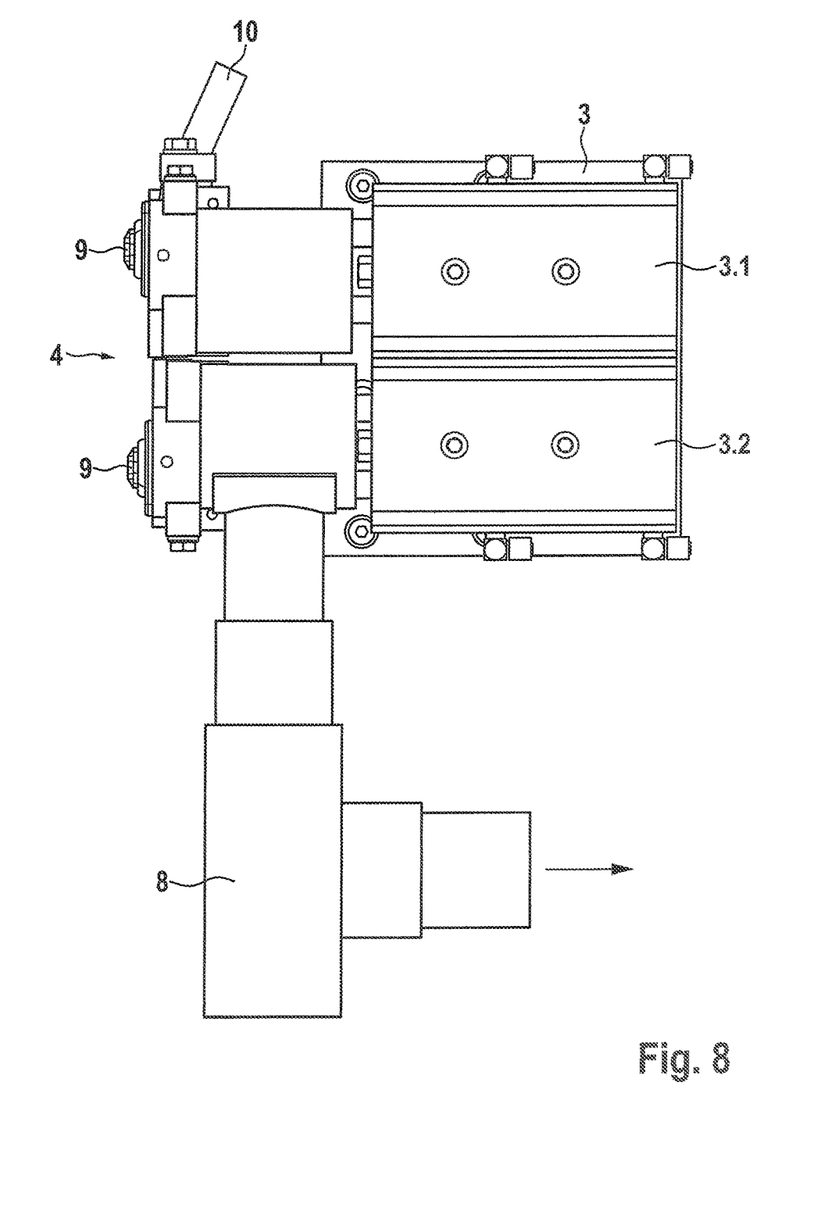
FIG. 8 is a lateral view of the embodiment according to FIG. 7.

FIG. 3 clearly shows the division into two parts, of the pressure plate 2 and the tool passageway 5. The pressure plate 2 has a horizontal division whereby the tool passageway 5 is also exactly divided into two. The tool passageway 5 is thus formed by two semicircular recesses 6.1 and 6.2 (FIG. 5) at opposite longitudinal edges of the pressure plate parts 2.1 and 2.2, which recesses form a closed tool passageway 5 when the pressure plate parts 2.1 and 2.2 are aligned, as shown in FIGS. 1, 2, 7, and 8. Further, comparison of the Figures will show that the suction chamber 7 is divided horizontally in a manner similar to the division of the pressure plate 2, whereby an upper and a lower chamber half are formed, with the upper chamber half being directly connected to the upper pressure plate part 2.1 and the lower chamber half being connected to the lower pressure plate part 2.2, so that when the pressure plate parts 2.1 and 2.2 are displaced with respect to each other the suction chamber parts are correspondingly displaced along with them.

The inventive features which are disclosed in the present Specification, the drawings, and the claims may be essential for realizing the disclosure when realized individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for machining a planar workpiece, comprising:
   a hold-down unit having a divided application surface for engaging a planar workpiece, the application surface being defined by a plurality of pressure plates movable relative to each other;
   a displacing unit coupled to at least one of the pressure plates for moving at least one of the pressure plates against the workpiece while the other pressure plate is displaced from the workpiece; and
   adjacent edges of the pressure plates defining an opening through which a machine tool can extend to perform work on the workpiece when the workpiece is engaged by the application surface.

2. The device according to claim 1 which further comprises at least one bearing on each of the pressure plates so that the machine tool can be easily guided over the workpiece.

3. The device according to claim 2 wherein the bearing comprises at least one spherical roller having air flowing around it so that foreign bodies on the workpiece are blown away from the roller.

4. The device according to claim 1 which further comprises:
   a chip removal system located adjacent the pressure plates opposite the application surface for removing chips generated by machining of the workpiece by a machine tool.

5. The device according to claim 4 wherein the chip removal system has a suction chamber through which the machine tool extends.

* * * * *